United States Patent [19]

Herrington, Jr.

[11] 4,289,727
[45] Sep. 15, 1981

[54] METHOD FOR EXTRUSION OF TUBULAR FILMS

[75] Inventor: F. John Herrington, Jr., Holcomb, N.Y.

[73] Assignee: Mobil Oil Corporation, New York, N.Y.

[21] Appl. No.: 105,351

[22] Filed: Dec. 19, 1979

[51] Int. Cl.$^3$ .............................................. B29D 7/24
[52] U.S. Cl. ................... 264/514; 264/173; 425/326.1
[58] Field of Search ........ 264/173, 171, 209, 514–515; 425/326.1, 133.1, 131.1

[56] References Cited

U.S. PATENT DOCUMENTS

| | | | |
|---|---|---|---|
| 3,322,870 | 5/1967 | Sacks | 264/514 |
| 3,337,665 | 8/1967 | Underwood et al. | 264/209 |
| 3,467,565 | 9/1969 | Utz | 264/514 |
| 3,819,792 | 6/1974 | Ono et al. | 264/173 |
| 3,949,042 | 4/1976 | Utz | 264/173 |
| 3,980,744 | 9/1976 | Cogswell | 264/173 |
| 3,997,383 | 12/1976 | Bieler et al. | 264/171 |
| 4,048,428 | 9/1977 | Baird, Jr. et al. | 264/173 |

Primary Examiner—Jeffery R. Thurlow
Attorney, Agent, or Firm—C. A. Huggett; M. G. Gilman; J. F. Powers, Jr.

[57] ABSTRACT

The present invention relates to a method for the extrusion of tubular thermoplastic films, in particular films produced from polymers such as high density polyethylene, polypropylene, and the like. The method comprises coextrusion of the polymer in the form of a tube which has adhered to its surface, another polymer which is characterized by having a significantly higher melting point than the melting point of the first polymer tube. The tubular films produced in this manner exhibit improved physical properties including a reduced tendency for rupturing or splitting in the machine direction when stresses are applied to such films.

7 Claims, No Drawings

METHOD FOR EXTRUSION OF TUBULAR FILMS

BACKGROUND OF THE INVENTION

1. Field of the Invention

The present invention relates to the extrusion of thermoplastic tubular films, in particular the employment of a coextrusion process to produce a tubular film laminate which may be employed in, for example, packaging applications. These applications may employ the present films in laminar form or, alternatively, may be employed in a delaminated form as monolayer materials.

2. Brief Description of the Prior Art

In the past, thin thermoplastic films which are intended for use in packaging, e.g., the fabrication of bags or overwrap packaging materials, have been produced by the extrusion of polymeric resins such as polyolefins in the form of a continuous seamless tubing or as continuous flat sheeting. In the latter instance, molten polymer resin is extruded through a slot die orifice onto the surface of a rotating drum or chill-roller. In the case of tubular film extrusion, employing a standard rotating screw extrusion apparatus, molten polyethylene is formed within the extruder and is extruded under pressure through an annular orifice into a tubular extrusion die. Air, under pressure, is introduced through the die and into the extruded tubing and causes the tubing to inflate. The air under pressure is entrapped within the inflated tubing, forming a bubble, by a pair of counter rotating, positively driven nip rollers located downstream of the tubular extrusion die. These rollers flatten the film tubing and tightly nip together opposing surfaces of the tube thereby maintaining the air, under pressure, encapsulated within the tubing throughout the extrusion operation. As the molten polymer leaves the tubular die, air rings which surround the tube adjacent to the die may be employed to cool the advancing molten polymer as it is being inflated and cause it to solidify prior to being nipped together downstream by the nip rollers. The resultant flattened tubing as it emerges from the nip rollers is subsequently fed to fabricating equipment, such as bag-making machinery and the like.

During the tubular extrusion, cooling forces acting upon the molten tube as it emerges from the die orifice result in solidification of the molten polymer prior to its being collapsed into a flattened tube by the positively driven nip rollers. Conventional air rings which surround the advancing tubing as well as ambient air temperature all take part in this cooling operation. Those skilled in the art are aware that, in the tubular extrusion process, there is a visibly defined transition point in the extruded tube somewhere between the die and nip rollers. This visible line which circumscribes the tube is referred to as the frost-line and is observed at that point along the length of the tubing where the transition from a semi-molten to a solid film occurs. This frost-line will appear around the tube at that point where the film bubble reaches the point of maximum diameter. In the case of the coextrusion of thermoplastic materials having a significant melting point differential, and where the higher melting point material forms the external layer of the tubing, the external molten layer will be the first to freeze, i.e. turn from a molten state to a solid state. This frozen external layer will then become a solid support for the lower melting point inner layer which remains in a molten or semi-molten state until it advances further downstream of the higher melting point material frost-line where it eventually solidifies, prior to entry into the nip rollers.

Drawing or stretching forces are continuously acting upon the polymer tubing intermediate the annular die orifice and the nip rollers. Some of these forces include a draw-down of the molten or semi-molten polymer by virtue of its being drawn from the die orifice by the positively driven nip rollers. The draw-down force acting on the film tube is significant as illustrated by the fact that the thickness of the molten material which emerges from the die orifice may be as high as 50 mils and the thickness of the final film layer may be on the order of 1 mil, which means that the draw-down ratio may be on the order of 50 to 1 or higher, in normal extrusion operations. Obviously, such ratios will vary depending upon factors such as the material being extruded, the extrusion equipment employed, the desired gauge of the final film produced, and the like. In the case of the extrusion of materials such as high density polyethylene, this draw-down force will impart a high degree of orientation to the polymer in the direction in which the draw-down occurs, i.e., the longitudinal or machine direction or direction in which the tube is advancing. Polymeric materials, such as high density polyethylene for example, are comprised of very long chain molecules, and the drawing or stretching of such materials when they are at elevated or orientation temperatures induces an alignment of these relatively long molecular chains in the direction of the draw. In the case of tubularly extruded high density polyethylene, such orientation produces a film which has a very high tensile modulus (stiffness) and strength in the machine direction or direction of draw. This is highly desirable where such material is to be employed in packaging and bag-making applications. However, such machine direction molecular alignment or orientation results in such films having a tendency to split or rupture when tensile forces are applied transversely to that machine direction. This apparently insurmountable problem attendant to and inherent in conventional prior art tubular extrusion techniques for these types of materials has resulted in a narrowing of the scope of end use applications available for such materials.

In addition to the draw-down force which acts upon the tubing being extruded hereinbefore described, other drawing forces including forces which extend the tube in a direction transverse to the machine direction while simultaneously imparting additional machine direction draw, are at work during the tubular extrusion process. These forces are a result of the tubing being inflated by the entrapped air bubble, such inflation pulling the tube both in the machine or longitudinal direction as well as expanding it transversely. The amount of tubular inflation is precisely controlled during tubular extrusion, dependent on the end use property requirements of the tubing which is being fabricated. The degree of inflation is referred to as the BUR or the blow-up ratio.

The transverse direction stretching by tube inflation orients the crystalline polymer in the transverse direction although not to the degree which the tube is machine direction oriented, i.e., the orientation is not balanced and the tube, as a result, remains splitty in the machine direction.

In the case of certain monolayer films which are tubularly extruded it has been found that reducing the blow-up ratio below about 4 to 1 usually results in films which have low resistance to transversely applied tensile forces, i.e., they are quite splitty or susceptible to tearing in the machine direction. This lowering of the BUR, lowering the amount of transverse direction stretching, increases the imbalance of orientation draw ratios and, accordingly, aggravates the machine direction splitting problem. Additionally, it has been found that increasing the rate of extrusion, i.e. speed of tube production, also results in a lowering of machine direction tear resistance. It has now been found, in accordance with the present invention, that when lower melting point polymers are extruded in the form of a tube and that tube is externally supported by a coextrusion of another higher melting point resin, the undesirable effects of BUR reduction and increased operating speeds normally encountered when these polymers are extruded is either eliminated or substantially reduced. While the exact mechanism which occurs to cause this phenomenon is not fully understood, it is theorized that since the higher melting polymer will freeze or solidify at a higher temperature than the lower melting point polymer, the higher melting polymer forms a solid, non-molten support structure which encases the inner polymer tube and either stops or retards the draw-down of this material at that point. If this in fact occurs, the inner, lower melting point, material remains molten for a period of time after its initial draw-down is completed, supported by the external solid tube, thereby allowing time for the molecular orientation imparted by the draw-down to relax before the crystalline tube solidifies. Such relaxation will reduce the degree of orientation in the final crystalline film product. Accordingly, since there is less orientation, the deleterious affects of unbalanced orientation on film properties is reduced. And since the unbalanced orientation is responsible for machine direction splittiness, such splittiness is thus reduced.

SUMMARY OF THE INVENTION

The present invention relates to a method for the extrusion of highly crystalline film materials such as for example, high density polyethylene, polypropylene, and the like. In particular, the method provides for the improvement of the film's physical properties including tear resistance and tensile strength. The method comprises an extrusion process for polymers in the form of a tube, inflation of the tube utilizing an encapsulated fluid, cooling of the tube to solidify and set the tube, and finally collapsing the tube by passing it through a pair of counter-rotating nip rollers. The improved method also contemplates simultaneously coextruding a higher melting point resinous tube around the external peripheral surface of the inner polymer tube whereby the higher melting point tube encasement solidifies around the inner tube before it, i.e. the inner tube solidifies, and while it is still in a semi-molten or molten condition. In a particularly preferred embodiment of the present invention, the lower melting inner polymer is a high density polyethylene while the higher melting, polymer support layer comprises nylon, having a melting point at least 50° F. higher than the high density polyethylene. Depending upon the end use application intended for the extruded material, the external layer of the higher melting point layer may be stripped from the outer surface of the inner tube and either discarded or recycled in the extrusion process. Alternatively, there may be some instances of end use applications where advantage may be taken of the physical properties of both layers whereby the product is used as a laminate, retaining the outer layer as a part of the final product. Such latter applications may include end use applications where its desired to have a layer of material which is sealable at a lower temperature and over a broader seal range than the other substrate layer. Other applications may be in areas where the particular properties of the outer layer are desirable and will compliment the properties of the crystalline material. An example of such a specific application might be in the area of a boil-bag where a laminate is formed into a bag which is intended for the containment of foodstuffs while they are being heated in water at an elevated temperature. In such a case, the presence of a nylon outer extrusion layer would prevent melting or burn through of an inner crystalline high density polyethylene polymer layer when such a bag comes into contact with the inner surface of the vessel employed to contain the water during heating.

DESCRIPTION OF SPECIFIC EMBODIMENTS

The following Examples set forth and describe the specific apparatus and production line conditions which were employed to produce certain specific embodiments of the present invention. Accordingly, these Examples should not be construed in a limiting sense and are presented hereinbelow only for purposes of illustration.

EXAMPLE 1

A laminar film having a thickness of about 1.2 mils was produced utilizing conventional tubular coextrusion equipment. One layer of the laminate comprised a high density polyethylene layer blended with about 10% by weight of an ionomer resin. The ionomer resin was identified by the manufacturer as Surlyn-DuPont AD-8231 and the high density polyethylene resin was identified by the manufacturer as DuPont 7810. The Surlyn material was blended with the high density polyethylene to enhance its adhesion characteristics to other polymers. The second layer of the laminate, which constituted about 8% of the overall thickness of the entire laminate, was Nylon-6 and identified by the manufacturer as Allied-8207. Two conventional thermoplastic extruders were employed to supply the respective molten polymers to the tubular coextrusion die. The high density polyethylene-Surlyn blend was fed to the die from a single 2½ inch extruder with a 20:1 L/D ratio, and the molten nylon was fed to the die with a 1½ inch, 24:1 L/D extruder. The total output through the die was approximately 88 pounds per hour. The die diameter was about 3½ inches and the maximum bubble diameter was about 14 inches, resulting in a blow-up ratio of about 4.0:1. The melt temperature was about 480° F. for both of the polymers. A vertical flow air ring was employed immediately adjacent to the die to cool the melt. The frost-line was observed at a point about 1.5 to 2.0 feet from the die. The resultant laminar film was tested for its strength, toughness and tear resistance, and the results thereof are set forth in the following Table I.

EXAMPLE 2

The material produced in accordance with Example 1 was delaminated and the physical characteristics of the high density polyethylene-Surlyn blend layer were tested. The results thereof are set forth in the following Table I.

EXAMPLE 3

Utilizing the procedure of Example 1, a 1.12 mil high density polyethylene-Surlyn film was produced. Testing of this film was conducted and the results of the testing are set forth in the following Table I.

EXAMPLE 4

A 1.12 mil high density polyethylene film (containing no Surlyn blended therein) was produced utilizing the procedure set forth in Example 1. The results of the physical testing of this film are set forth in the following Table I.

TABLE I

| Material Tested | Yield Strength MD psi | Yield Strength TD psi | Ultimate Strength MD psi | Ultimate Strength TD psi | Toughness MD ft. lbs/in³ | Toughness TD ft. lbs/in³ | Elongation MD % | Elongation TD % | Elmendorf Tear MD gms/mil |
|---|---|---|---|---|---|---|---|---|---|
| 1.2 mil 8% Nylon 92% HDPE* | 3000 | 3239 | 7775 | 4517 | 1672 | 1553 | 471 | 613 | 21 |
| Same as above with Nylon stripped off HDPE | 2876 | 3238 | 8473 | 5390 | 1982 | 2008 | 531 | 798 | 23 |
| 1.12 mil HDPE | 2952 | 3308 | 9100 | 5548 | 2121 | 2044 | 525 | 803 | 13 |
| 1.12 mil HDPE (w/o Surlyn) | 2912 | 3168 | 8488 | 5508 | 1873 | 2080 | 498 | 838 | 12 |

*High density polyethylene resin which contains about 10% by weight of Surlyn, an ionomer manufactured by DuPont which acts as an adhesion promoter.

It will be seen from the data presented in the foregoing Table I that the method of the present invention may be employed to extrude, in tubular form, highly crystalline materials such as high density polyethylene, wherein the strength of the final high density polyethylene tube, in particular its tear resistance in the machine direction as shown by its Elmendorf tear strength, is improved by a factor of almost 100%.

It will be understood that, although for purposes of illustration the higher melting point thermoplastic layer has been described as constituting the outer layer of the laminate, obviously this layer may alternatively constitute the inner laminar layer during the coextrusion operation.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing blown crystalline high density polyethylene film comprising the steps of:
   melt extruding a thin inner tubular layer of said high density polyethylene;
   coextruding a thinner outer tubular layer of higher-melting thermoplastic at a temperature at least 50° F. above the high density polyethylene melting point;
   inflating the tubular coextruded film utilizing an encapsulated fluid;
   cooling the tubular film to solidify the outer higher melting thermoplastic layer before solidifying the inner tubular layer; and externally supporting the molten high density polyethylene layer while permitting relaxation of molecular orientation before solidification of the inner tubular film;
   thereby reducing the tendency for machine direction rupturing or splitting of the high density polyethylene under stress.

2. The method of claim 1 wherein said inner tubular layer consists essentially of crystalline high density polyethylene containing an adhesion enhancing amount of ionomoner resin.

3. The method of claim 2 wherein the outer tubular layer consists essentially of nylon-6.

4. The method of claim 3 wherein the inner and outer layers are both extruded at substantially the same temperature.

5. The method of claim 4 wherein the coextrusion temperature is about 480° F.

6. The method of claim 1 wherein the tubular blow up ratio during inflation is about 4:1.

7. The method of claim 1 wherein the tubular film has a thickness of about 1.12 to 1.2 mils and said outer layer constitutes about 8% of the overall film thickness.

* * * * *